(12) United States Patent  (10) Patent No.: US 8,306,204 B2
Erhart et al.  (45) Date of Patent: Nov. 6, 2012

(54) VARIABLE NOISE CONTROL THRESHOLD

(75) Inventors: George Erhart, Loveland, CO (US);
Valentine Matula, Granville, OH (US);
David Skiba, Golden, CO (US)

(73) Assignee: Avaya Inc., Basking Ridge, NJ (US)

( * ) Notice: Subject to any disclaimer, the term of this patent is extended or adjusted under 35 U.S.C. 154(b) by 349 days.

(21) Appl. No.: 12/708,388

(22) Filed: Feb. 18, 2010

(65) Prior Publication Data

US 2011/0200183 A1  Aug. 18, 2011

(51) Int. Cl.
*H04M 3/42* (2006.01)
(52) U.S. Cl. .................... 379/202.01; 370/260; 709/204
(58) Field of Classification Search ............. 379/202.01, 379/203.01; 370/260; 709/204
See application file for complete search history.

(56) References Cited

U.S. PATENT DOCUMENTS

| | | | |
|---|---|---|---|
| 4,147,892 A | 4/1979 | Miller | |
| 4,991,227 A | 2/1991 | Kehler, Jr. | |
| 6,243,678 B1 | 6/2001 | Erhart et al. | |
| 6,381,224 B1 | 4/2002 | Lane et al. | |
| 2009/0187474 A1* | 7/2009 | Longinotti-Buitoni | 705/11 |
| 2009/0216835 A1 | 8/2009 | Jain et al. | |
| 2010/0061538 A1* | 3/2010 | Coleman et al. | 379/202.01 |
| 2010/0135481 A1* | 6/2010 | Frauenthal et al. | 379/406.06 |
| 2011/0149013 A1* | 6/2011 | Khot et al. | 348/14.09 |

* cited by examiner

*Primary Examiner* — Creighton Smith
(74) *Attorney, Agent, or Firm* — Sheridan Ross P.C.

(57) ABSTRACT

An interface allows a simple control to be shared by one or more conference participants. One exemplary embodiment maps complex techniques associated with conference control into a simple control. The control may be a single slider to adjust both the amount of control and the level of aggressiveness to get the best quality in a dynamic and changing environment. Another exemplary type of control would be to use two sliders—one to select and/or aggregate conference control mechanisms, and the other to adjust the aggressiveness of the selected conference control mechanism or aggregated mechanisms. Another exemplary type of control could be a simple rotary dial to emulate the two-dimensionality of two or more sliders. These controls could have the techniques associated with each position dynamically chosen and/or updated, for example, throughout a conference.

20 Claims, 6 Drawing Sheets

VARIABLE NOISE CONTROL THRESHOLD

FIELD OF THE INVENTION

An exemplary aspect of this invention relates to one or more of noise, gain, and conference control. More specifically, an exemplary embodiment of this invention relates to providing a simplified user interface that provides one or more of gain and noise management in a conference environment.

BACKGROUND

In general, it is desirable to improve the intelligibility of parties in a teleconference. Existing solutions tend to be an all or nothing control of noise on a conference bridge. Under full control, all participants are on mute except for the host. Under no control, all participants are on open mike. Different speakers talk at different levels, spectral distributions, or the like, and speech may not be intelligible for all parties in the call, given the settings associated with the telephony devices or inherent to the devices themselves. Additionally, regular as well as unexpected background noises can routinely disrupt conferences.

In general, it is not usually possible to determine the initial settings for the teleconference that will be appropriate for the duration of the call. The controls themselves can be complex and confusing. Furthermore, maintaining optimal settings for mutual intelligibility can be impractical, distracting, and frustrating owing to the dynamics of such teleconferences given there can be periodic or irregular background events, noises, or the like.

SUMMARY

To help with overcoming some of the exemplary deficiencies noted above, what is needed is a simplified yet sophisticated method of controlling one or more of gain and noise control in a conference environment. Prior systems do not integrate multiple techniques to improve intelligibility into a single, simple control or interface.

An exemplary embodiment of the invention integrates a plethora of techniques used to improve the overall intelligibility of speech in a conference call into a single simple control used by the host or alternatively, replicated and provided to one or more of the participants at their individual endpoints for their own use and under their own control.

Another exemplary embodiment allows a simple control to be shared by one or more of the participants. Another exemplary embodiment maps complex techniques associated with conference control into a simple control. The control may be a single slider to adjust both the amount of control and the level of aggressiveness to get the best quality in a dynamic and changing environment. Another exemplary type of control would be to use two sliders—one to select and/or aggregate conference control mechanisms, and the other to adjust the aggressiveness of the selected conference control mechanism or aggregated mechanisms. Another exemplary type of control could be a simple rotary dial to emulate the two-dimensionality of two or more sliders.

A further exemplary approach would be to provide all conference participants one of the previously mentioned simple controls and to allow them to individually select the type or types of control over the conference environment. Users do not necessarily need to know what conference control techniques are being applied—just that changes are being made. In this manner, user input could be used to simply indicate their subjective dissatisfaction with the current teleconference.

The techniques employed could change and adapt throughout the call based on one or more of events that occur during the call and the past history of similar such calls and devices as maintained in, for example, a database. A low setting for the controller could apply no techniques and allow all participants to enter unprocessed. Higher settings could, for example, incorporate more techniques for improving intelligibility and more participants are selected for the type of processing relevant to improving the quality of their contribution to the conference. For example, on a low setting, conference participants who are on mobile phones are filtered. On a higher setting, more conference participants are filtered, such as those on mobile phones, those who are on noisy channels and those who appear to have a large amount of background noise.

A simple example of a technique could be to limit the number of hot talkers mixed into a conference. Another simple example could be to "make speech a little worse" but decrease disruptive background noise, or vice versa. Another simple example could be to decrease noise filtering to the incoming lines so that, while there might be some clipping of noisy lines, the background noise during non-speech is removed. Another simple example could be to apply side-chaining to attenuate the non-host connections to give the host connection more authority. Side-chaining modulates one channel by another, for example, when a DJ talks the music is attenuated. Another simple example would be to use ANI II (Automatic Number Identification) digits to identify the type of caller, such as a mobile phone, or the like, which could be assumed to have greater noise potential, or the like, and therefore be more aggressive with the type and intensity of technique applied to the caller and device on that channel. Another simple example could be to apply variable squelch techniques to include aspects of noisy or of a low energy caller or device. Another simple example could be to exclude regular periodic background noise using Active Noise Control (ANC) by applying phase cancellation to baby's cries, thumps, door slams, or the like. Another simple example would be to reconnect parties when disconnected. A more complex and dynamic example would be to assess incoming speech, if it is Adaptive Multi-Rate (AMR) narrowband, then it would be assumed to be mobile and subject to aggressive processing. Similarly, the spectral distribution of the incoming signal, G.711, or the like, could be analyzed and previously encoded AMR signature(s) retrieved to target that channel for aggressive processing.

An additional more complex example would be to use speech, voice, speaker recognition, or the like, to assess the quality of all connections and differently process each to provide the best overall quality to all parties. For example, a connection with multiple parties could be expanded when the softest speaker speaks. Other techniques using compression gradients, frequency shaping and muting, and others known to those schooled in the art could also be applied with great success.

As noted earlier, another factor that could be taken into consideration is the past history of events during the conference or past conferences, knowledge of device deficiencies and/or their characteristics (either static or dynamic in response to conference events) and knowledge of previously used techniques and their success or failure could also be used to improve conference quality.

As discussed, prior techniques tend to be directed toward when noise controls are set on zero, there is no control at all with all participants being on open mike. Then, when full noise control is selected, all participants are on mute except for the host. Various techniques were also provided that allow the ability to selectively visually mute a line participant, again, being either on or off.

In accordance with one exemplary embodiment, an interface that includes, a slider bar, dial mechanism, controllable interface, or the like, can be utilized for conference control. This could initially be set by the host, shared amongst one or more conference participants, and/or provided individually or to groups of conference participants. For example, if the "slider bar" was set to a low level, everyone would be included in the conference, with all participants being unfiltered. As control is increased, two exemplary things could happen:

1. Limit number of hot talkers mixed in the bridge. At highest setting, maybe only the top two hot talkers are allowed onto the bridge, all others will be placed on mute.

2. Apply increased noise filtering to the incoming line(s), so that while there might be some clipping of noisy lines, the background noise during non-speech is removed.

In general, an exemplary embodiment of this idea takes more complex concepts like bridge control mapping and simplifies them into one or more sliders or controls that the general population can use to "make speech a little worse, but generally increase the quality of the teleconference by decreasing disruptive noise."

The above ideas can be expanded and can be performed one or more of dynamically and automatically, for example, taking into consideration a conferee's endpoint, such as a mobile phone, home phone, VOIP phone, or the like, and based on certain assumptions about the endpoint. For example, if the user is associated with a mobile phone, it can generally be assumed that there will be a greater noise possibility from the mobile endpoint and therefore the system could be more dynamic in mitigating noise on that particular channel.

Another mechanism could be to assess incoming speech, and if it is on AMR narrowband, assume it is a mobile device. More advanced techniques could be expanded to look at spectral distribution of incoming G.711 and look for previous AMR coded signatures which could then be applied to that channel.

The use of mute in one or more channels can also come into play in assisting with improving conference quality. For example, conference participants often mute the channel to say something to others in the room, without the people on the other side of the phone conversation being able to hear it. As such, another exemplary embodiment lowers the volume of the speakerphone to something a bit lower than the in-room conversation.

This self-normalizing speaker phone concept could be implemented by the speakerphone sampling the room noise and room conversation level, with the speakerphone volume being set to be on par with room conversation level, or below it. For example, the speaker phone could dynamically go into a "whisper mode" when the room is quiet, and boost the signal when the room is noisy or conversation is loud. That way, speaker phone volume is always on par with people in the conference room.

Aspects of the invention thus relate to conference control.

Even further aspects of the invention relate to sound management, and more particularly to one or more of noise control, gain control, dynamic control, and management of one or more channels of audio and/or multimedia information.

Even further aspects of the invention relate to a simplified interface for conference management that allows a user to generally improve their conference experience.

Even further aspects of the invention relate to a non-linear control of conference characteristics where dynamic, discrete, and optionally automatic non-linear bands of attack are used to in general improve conference quality.

Even further aspects of the invention relate to mapping of different algorithms, noise filters, DSP techniques, gain controls, and the like, into different portions of an interface, such as one or more sliders or dials.

Even further aspects of the invention relate to using one or more of color coding, icons, or other identifies to correlate the type of technique(s) relative to the position of a slider. As discussed, since the slider can correlate to a non-linear band of attack, the use of one or more of colors, icons, and the like can help a user better understand what techniques are being implemented.

Even further aspects of the invention relate to providing different mappings for different participants in a conference environment.

Even further aspects of the invention relate to providing one or more automatic/dynamic controls that can be shared between one or more conference participants, and can affect one or more channels within a conference.

Even further aspects of the invention relate to utilization of the non-linear slider technique expanded to include dynamic conference improvement for one or more of, or each, channel in a conference.

Even further aspects of the invention relate to providing an interface, such as a linear slider, that has non-linear characteristics associated with the slider's position.

The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be illustrated below in conjunction with an exemplary communication system, such as a conference call system. Although well suited for use with, e.g., a system using a server(s), conference bridge and/or database(s), the invention is not limited to use with any particular type of communication system or configuration of system elements. Those skilled in the art will recognize that the disclosed techniques may be used in any communication application in which it is desirable to modify conference characteristics.

The exemplary systems and methods of this invention will also be described in relation to communications software, modules, and associated communication hardware. However, to avoid unnecessarily obscuring the present invention, the following description omits well-known structures, network components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communication network and/or the Internet, or within a dedicated secure, unsecured and/or encrypted system. Thus, it should be appreciated that the components of the system can be combined into one or more devices, such as an enterprise server, a PBX, a conference bridge and/or endpoints or collocated on a particular node of a distributed network, such as an analog and/or digital communication network. As will be appreciated from the following description, and for reasons of computational efficiency, the components of the system can be arranged at any location within a distributed network without affecting the operation of the system. For example, the various components can be located in a local server, at one or more users' premises, or some combination thereof. Similarly, one or more functional portions of the system could be distributed between a server, gateway, PBX, conference bridge, and/or associated communication device.

While the term slider as used herein can be interpreted as a specific type of user interface, it is to be appreciated that the term slider can in general refer to any type of interface that allows selection of specific settings that control a conference including one or more of a dial, radio button, drop-down menu, icons, colors, or the like.

Figure 1:
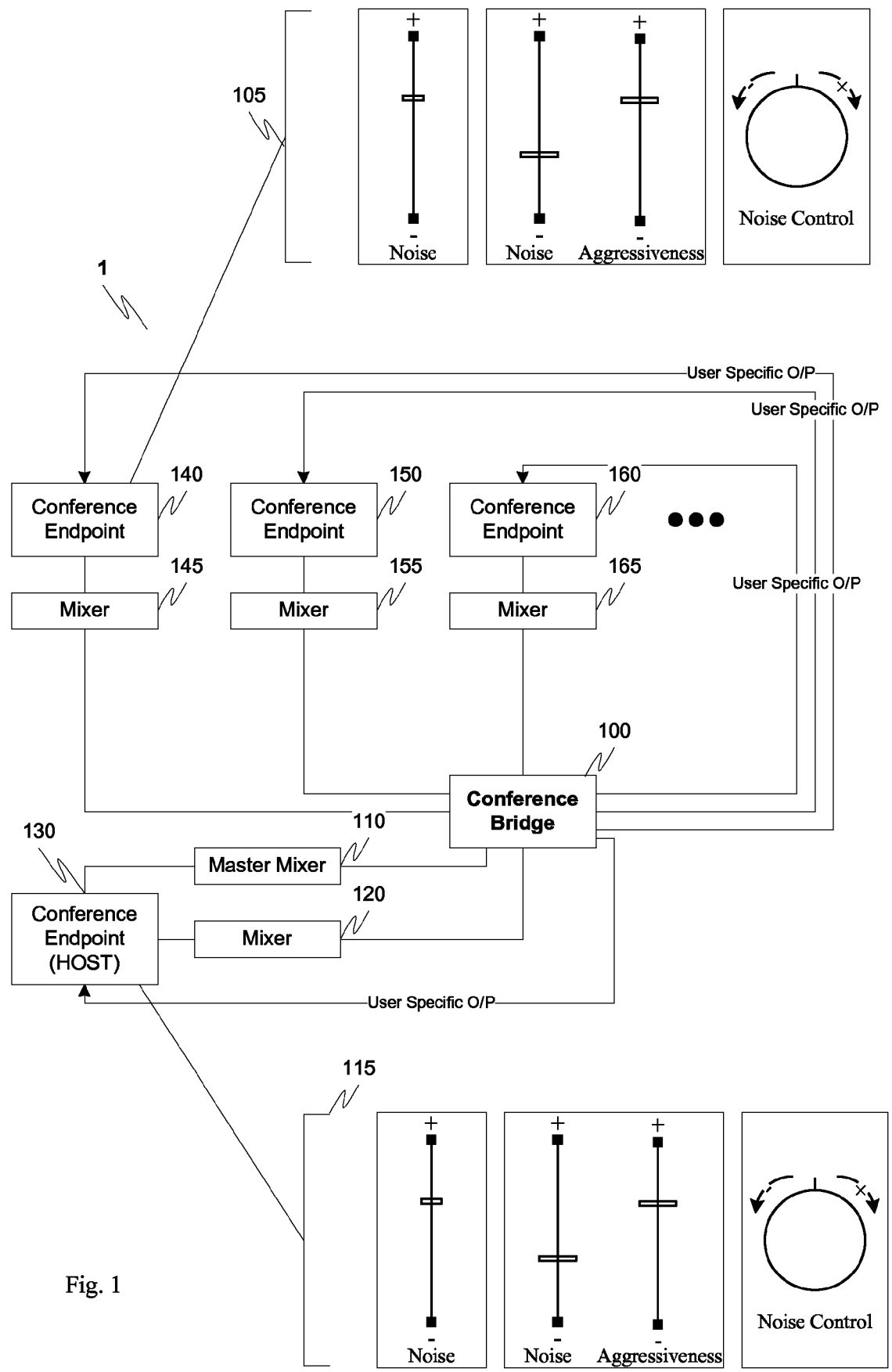
FIG. 1 illustrates an exemplary conference environment according to this invention.

FIG. 1 illustrates an exemplary communications environment according to this invention. The communications environment 1 includes a conference bridge 100, a master mixer 110, mixer 120, conference endpoint 130, and conference endpoints 140-160 and corresponding mixers 145-165, respectively. Optionally provided at one or more of the conference endpoints are interfaces 105 and 115 that can include, for example, sliders, dials, or in general any mechanism that allows for the control of conference characteristics. As will be appreciated, the various dials, sliders, and the like can be incorporated into hardware, software, such as in a graphical user interface, or some combination thereof provided the endpoint on, for example, a display, on a speaker phone, a soft phone, or within a smart phone.

Figure 2:
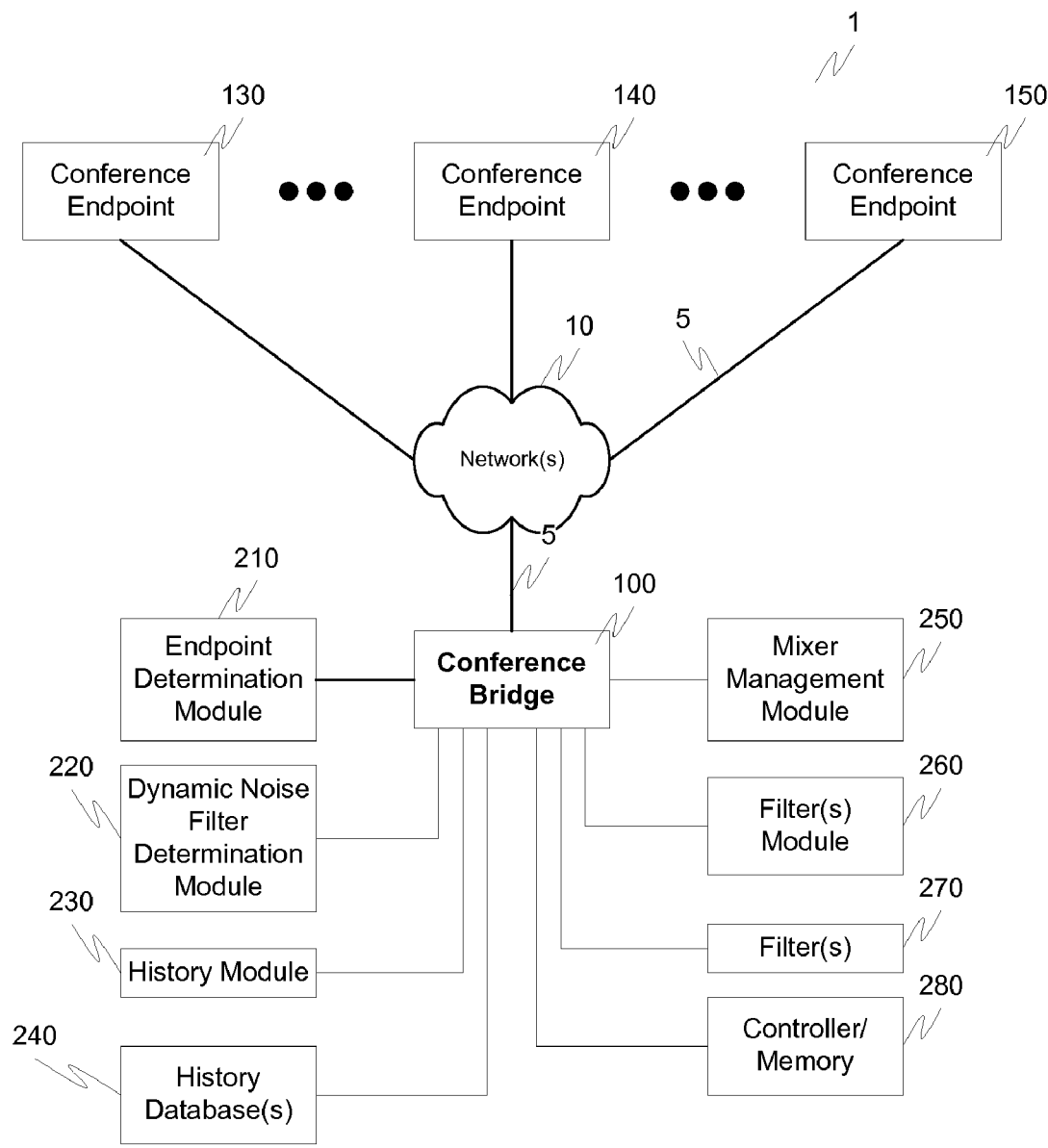
FIG. 2 is a more detailed view of the conference environment according to this invention.

FIG. 2 provides additional detail of the conference environment 1 such as conference endpoint 130, conference endpoint 140, conference endpoint 150, and conference bridge 110, all interconnected via one or more networks 10 and links 5, with the conference bridge 100 being connected to an endpoint determination module 210, a dynamic noise filter determination module 220, a history module 230, history database 240, a mixer management module 250, a filter module 260, one or more filters 270, and in controller/memory 280.

In operation, one or more of the conference endpoints 130-160 can be provided with an interface that allows improvement of conference characteristics. As discussed, this interface can be shared amongst one or more of the endpoints, provided to each individual endpoint, or some combination thereof.

In accordance with a first exemplary embodiment, the conference endpoint 130 provides a mix, via the master mixer 110, to all conference endpoints. In this exemplary embodiment, individual conference endpoints are not provided with interfaces that allow individualized control of conference characteristics. More specifically, upon initiation of the conference, the user associated with the conference endpoint 130 can initiate a master mix. For example, based on listening to the various channels as various users connect, the user associated with conference endpoint 130 can adjust their interface 115 to what the user thinks "sounds best." Optionally, and based on the level of the slider and interface 115, the various endpoints can be analyzed either upon connecting, or during the conference, in an effort to provide a better conference experience.

For example, if it is determined that each conference endpoint is associated with a mobile phone, the characteristics associated with each position on the slider can be dynamically updated to provide more aggressive noise management appreciating that each conference endpoint will probably be noisy. Alternatively, if it is determined that some of the endpoints are wireless, some of the other endpoints are VOIP, and some of the other endpoints are land-line based, the algorithms, noise processing, and DSP functionality of each position of the slider could be configured to be something more appropriate for that combination of endpoints. As discussed, use of spectral distribution of the incoming signal, G.711, or the like, could be utilized in determining how aggressive an approach to take to improve the conference experience. Moreover, optionally the history of a particular endpoint can be viewed, for example, based on a caller ID, and reference to one or more history databases 240 used to upload previously used noise control/gain signatures and settings.

Upon completion of this initial conference setup, the master mix is set and distributed, via the master mixer 110 and conference bridge 100, to the conference endpoints. As the conference progresses, and in cooperation with the dynamic noise filter determination module 220, the mixer management module 250, the one or more filter modules 260 and corresponding filters 270, the conference, and in particular the channels associated with each conference endpoint can be monitored, and a determination made, by the dynamic noise filter determination module 220 in cooperation with controller/memory 280, whether or not an adjustment should be made. For example, this adjustment can be based on increases in noise, decreases in noise, users joining or dropping off the conference, hot talkers, soft talkers, and the like as, for example, discussed above in the summary.

If a change is to be made, the dynamic noise filter determination module 220 analyzes one or more of the endpoints, noise characteristics, channel information, history information, mixer information, or the like, as well as whether conference endpoint 130 has requested an update based on the position of the slider in the interface 115, and adjusts the master mix based thereon. As will be discussed hereinafter in greater detail, these adjustments can be non-linear with a change of, for example, just one position on the slider corresponding to a significantly different conference experience.

This iterative technique of analyzing one or more of the conference endpoints, channels, noise information, interface information, and the like, can optionally continue throughout the conference and be updated as many times as necessary either based automatically on determinations made by the dynamic noise filter determination module 220 and/or endpoint determination module 210, and changes corresponding to movement of the slider within interface 115.

In accordance with another exemplary embodiment, each conference endpoint 130-160 can be provided with its own interface, such as interface 105, that allows individualized control over that conference endpoint's mix. For example, conference endpoint 140 would receive, via mixer 145, a master mix from the master mixer 110 associated with conference endpoint 130. A user could then adjust their interface 105 until a satisfactory mix is obtained. As in the above example, an initial determination of the conference environment could be performed by the dynamic noise filter determination module 220, cooperating with the endpoint determination module 210, history module 230, history database 240, mixer management module 250 and controller/memory 280 to determine automatically or semi-automatically an appropriate mix based on known, predetermined optimized conference settings.

As discussed, the techniques used in each position of the slider and the interface 105 could then be populated based on this initial assessment, taking into consideration one or more of the conference endpoints, channel information, noise assessment information, and the like. Again, as one or more users join or leave the conference, these settings could be updated (optionally on a channel by channel basis), as well as updated based on noise information and/or input received from the user via the interface. Moreover, and as previously discussed, history information can also be utilized in determining appropriate channel control characteristics. Furthermore, a profile could be associated with an endpoint, and stored, for example, in the history database 240, with this profile indicating historical settings the user has selected that presumably correspond to their preferred conference experience. These profile settings could be pre-loaded in each individual conference endpoints' corresponding mixer, as well as used in cooperation with dynamic noise filter determination module 220 and endpoint determination module 210 with the mixer management module 250 executing the user-requested mix.

Figure 3:
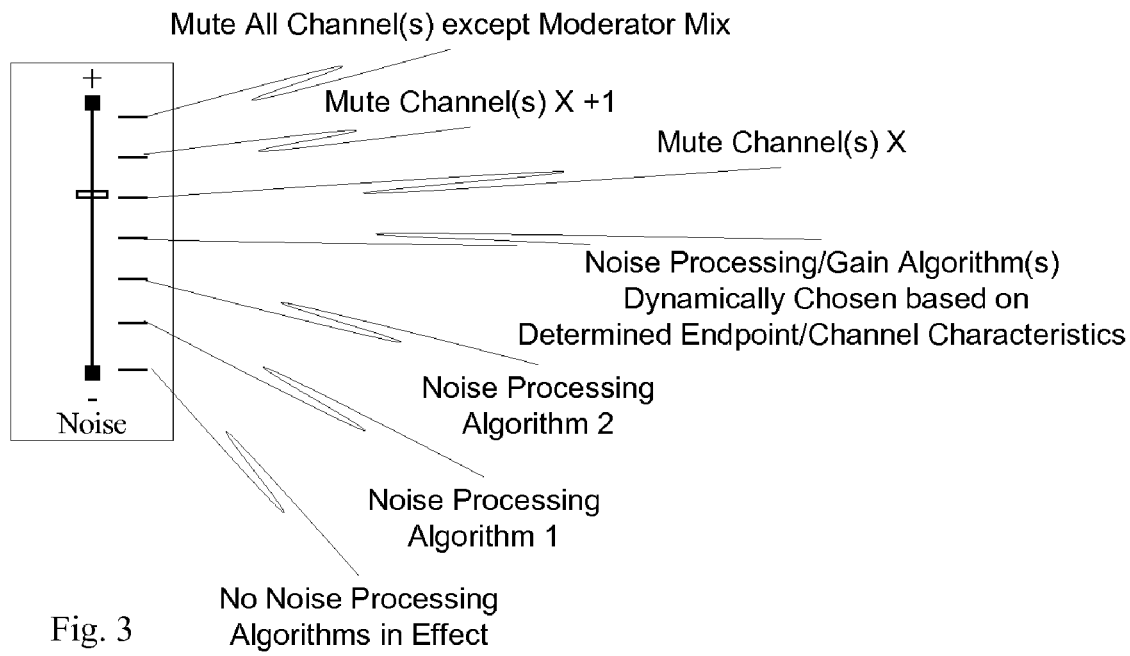
FIG. 3 illustrates the non-linear behavior of a linear slider according to an exemplary embodiment of this invention.
Figure 4:
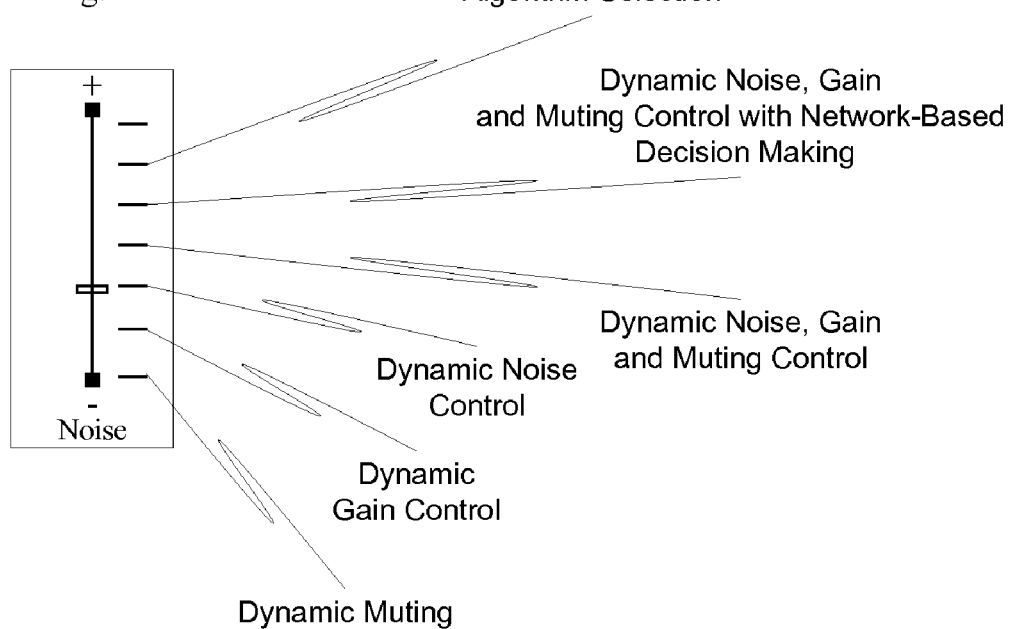
FIG. 4 illustrates another example a linear slider with non-linear behaviors according to this invention.

FIGS. 3 and 4 illustrate exemplary sliders and their corresponding non-linear control on the conference environment. As discussed, the non-linear behavior of the slider mechanism, optionally in combination with different mappings for different communities, customers, channels, and/or endpoints assist with simplifying and enhancing a customer's conference experience. For example, with a slider positioned at 51%, one or more other channels on the conference could be muted, however, with the slider at position of 49%, one or more of the other channels could simply have a reduced volume. This type of non-linear control can provide advantages over traditional linear-types of adjustments.

In FIG. 3, a slider is shown that includes seven distinct positions with corresponding non-linear behaviors. For example, in position 1, no noise processing algorithms are in effect. In position 2, noise processing algorithm 1 is in effect. In position 3, noise processing algorithm 2 is in effect, in position 4, noise processing/gain algorithms have been dynamically chosen based on the determined endpoint/channel characteristics. In channel 5, one or more channels are muted. In position 6, additional channels are muted. In position 7, all channels are muted except for the moderator mix. Even though seven distinct positions on the slider are shown, in accordance with one exemplary embodiment, combinations of the various techniques can be used, such as if the slider is between position 2 and 3, noise processing algorithms 1 and 2 will be used.

FIG. 4 illustrates another exemplary slider where the functionality corresponding to the slider position was automatically populated based on an assessment of conference characteristics. In accordance with this exemplary embodiment, position 1 corresponds to dynamic muting, position 2 to dynamic gain control, position 3 to dynamic noise control, position 4 to dynamic noise, gain and muting control, position 5 to dynamic noise, gain and muting control with network based decision making, and positions 6 and 7 corresponding to fully automatic and dynamic channel-based decision making and algorithms selection. Clearly, this interface provides more automatic and dynamic control such as may be necessary when there is a very complex noise environment, a large number of conference participants, or the like.

For dynamic muting, one or more channels can be selectively muted and un-muted based, for example, on the detection of various types of noise that may exceed a particular threshold. Similarly, the dynamic gain control position assists with automatically compensating for hot talkers or soft talkers, as well as optionally accommodates conference room volume levels and endpoint capabilities.

The dynamic noise control position utilizes the dynamic noise filter determination module 220 in cooperation with the filter module 260 and one more filters 270 do dynamically, actively, and automatically control the noise on one or more channels. The dynamic noise, gain, and muting control can combine the prior three positions corresponding effects to improve conference characteristics.

The fifth position on the slider is a combination of the above techniques, in combination with network-based, and more specifically, channel-based, decision making. For example, the channel-based decision making can take into account one or more of history stored in the history database 240, profile information, such as that associated with a conference endpoint, real-time channel analysis, and the like, in an effort to improve a conference experience. The sixth and seventh positions on the slider provide fully automatic and dynamic channel-based decision making with automatic algorithm selection that can be based on any one or more of the above techniques. As with the previous example, intermediary slider positions between the demarcation points can provide a blend of those associated techniques.

Figure 5:
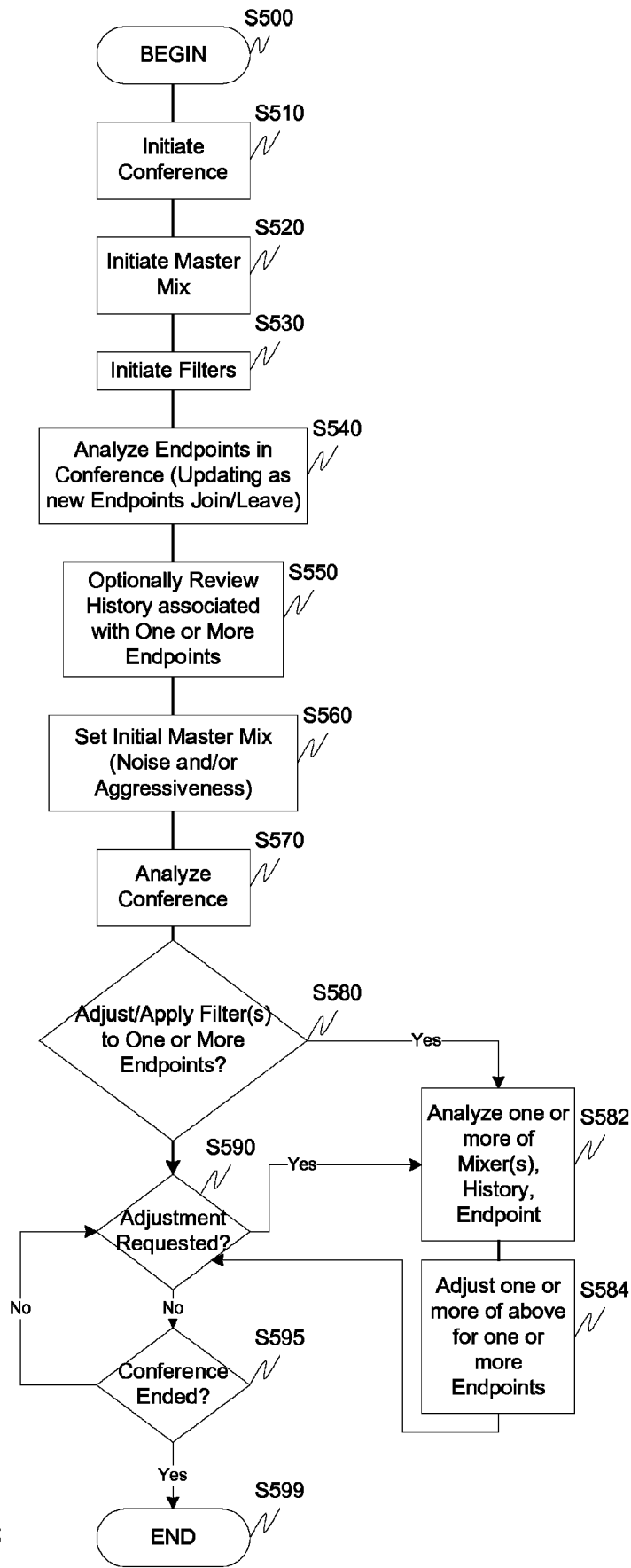
FIG. 5 is a flowchart illustrating an exemplary method of improving conference quality according to this invention.

FIG. 5 outlines an exemplary method for controlling a conference environment according to an exemplary embodiment of this invention where a single mix is provided to all conference participants. In particular, control begins in step S500 and continues to step S510. In step S510, the conference is initiated with one or more endpoints joining in. Next, in step S520, a master mix is initiated either automatically, based on the host's input settings, or some combination thereof. Then, in step S530, the various filters, if any, are implemented. Control then continues to step S540.

In step S540, optionally one or more of the endpoints in the conference can be analyzed to determine such things as noise level, volume level, and in general any characteristic of the channel or endpoint. Next, in step S550, history associated with the one or more endpoints can also optionally be reviewed to determine, for example, prior noise information, prior channel information, previous volume levels, and in general any information associated with the endpoint. Then, in step S560, the initial master mix can be finalized either automatically, semi-automatically, or set by the host based on one or more of the above factors. Control then continues to step S570.

In step S570, conference analysis and monitoring commences. Next, in step S580, a determination is made whether to adjust the mix. If an adjustment to the mix is desired, control continues to step S582. Otherwise, control jumps to step S590.

In step S582, one or more of interface input, mixer information, history information, endpoints joining or departing the conference, noise information, gain information, volume information, or the like, can be analyzed. As discussed, any characteristic associated with the conference can then be adjusted generally based on the position of the slider in the interface. However, if the host has moved the slider in the interface, the conference improvement techniques associated with that particular slider position will be invoked. As will be appreciated, some of the positions of the slider may or may not have automatic or dynamic functionality corresponding thereto which would of course have a direct impact on the techniques applied in step S584. Control then continues to step S590.

In step S590, a determination is made whether an additional adjustment has been requested. If additional adjustments have been requested via the interface, control jumps back to step S582 with control otherwise continuing to step S595. In step S595, a determination is made whether the conference has ended. If the conference has ended, control jumps to step S599 with control otherwise returning to step S590.

Figure 6:
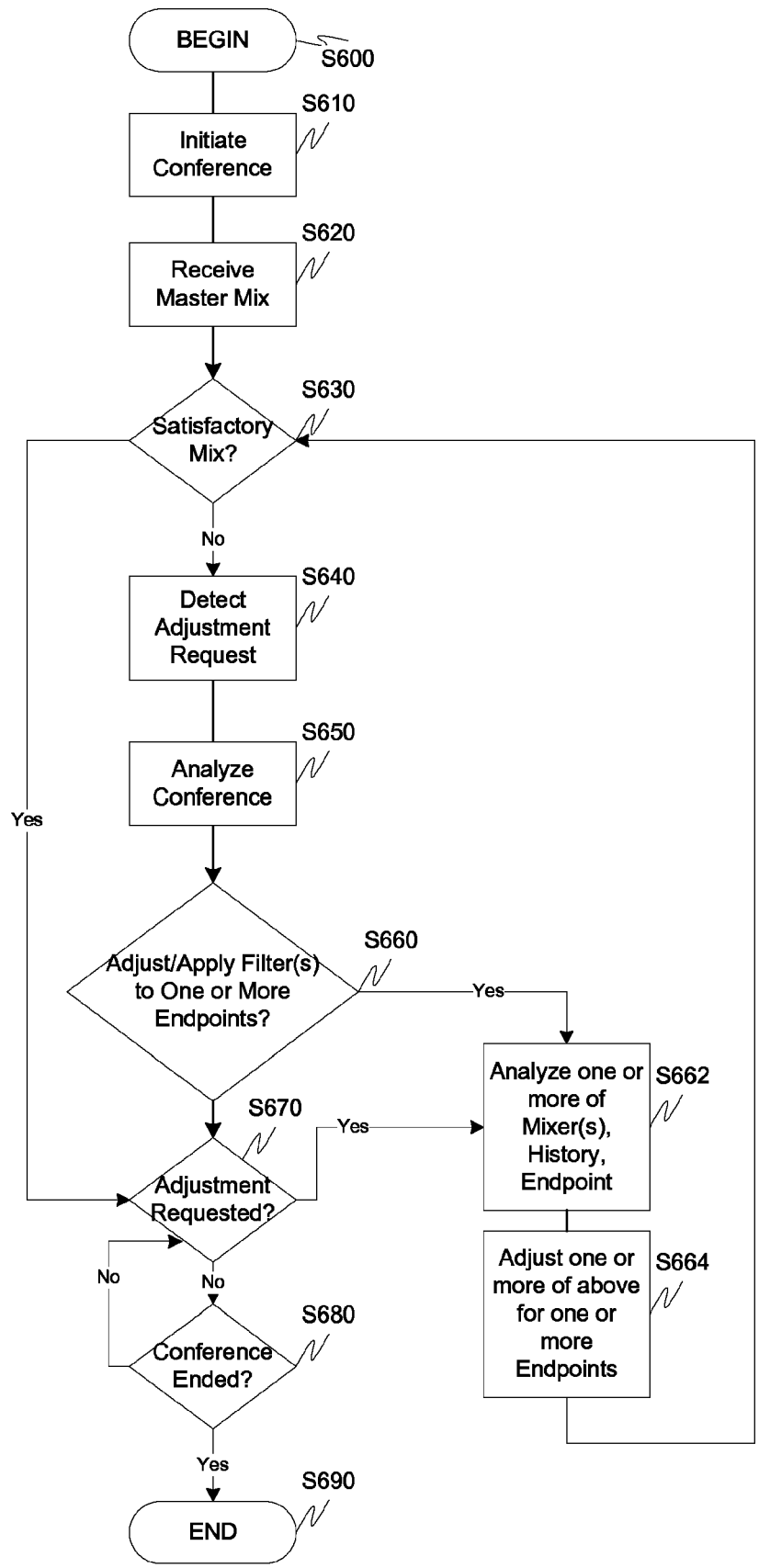
FIG. 6 is a flowchart outlining another exemplary embodiment of improving conference quality according to this invention.

FIG. 6 outlines an exemplary method for controlling a conference environment according to an exemplary embodiment of this invention where one or more endpoints control their respective mixes. In particular, control begins in step S600 and continues to step S610. In step S610, the conference is initiated with one or more endpoints joining in. Next, in step S620, a master mix is initiated either automatically, based on the host's input settings, or some combination thereof and received at an endpoint. Control then continues to step S630.

In step S630, a determination is made whether the mix is satisfactory. If the mix is satisfactory, control jumps to step S670 with control otherwise continuing to step S640.

In step S640, a request to adjust one or more channels in the conference is detected. Next, in step S650, the cone or more channels are analyzed to determine characteristics thereof. Then, in step S660, a determination is made whether to adjust and/or apply filters or other controls to one or more endpoints.

If the determination is made to adjust and/or apply filters or other controls, control jumps to step S662, otherwise control continues to step S670.

In step S662 one or more of the endpoints in the conference can be analyzed to determine such things as noise level, volume level, and in general any characteristic of the channel or endpoint. Furthermore, history associated with the one or more endpoints can also optionally be reviewed to determine, for example, prior noise information, prior channel information, previous volume levels, and in general any information associated with the endpoint. Additionally, one or more of interface input, mixer information, history information, endpoints joining or departing the conference, noise information, gain information, volume information, or the like, can be analyzed. As discussed, any characteristic associated with the conference can then be adjusted generally based on the position of the slider in the interface. However, if the user associated with the endpoint has moved the slider in the interface, the conference improvement techniques associated with that particular slider position will be invoked. As will be appreciated, some of the positions of the slider may or may not have automatic or dynamic functionality corresponding thereto which would of course have a direct impact on the techniques applied in step S664. Control then jumps back to step S630.

In step S670, a determination is made whether an additional adjustment has been requested. If additional adjustments have been requested via the interface, control jumps back to step S662 with control otherwise continuing to step S680. In step S680, a determination is made whether the conference has ended. If the conference has ended, control jumps to step S690 with control otherwise returning to step S670.

Figure 7:
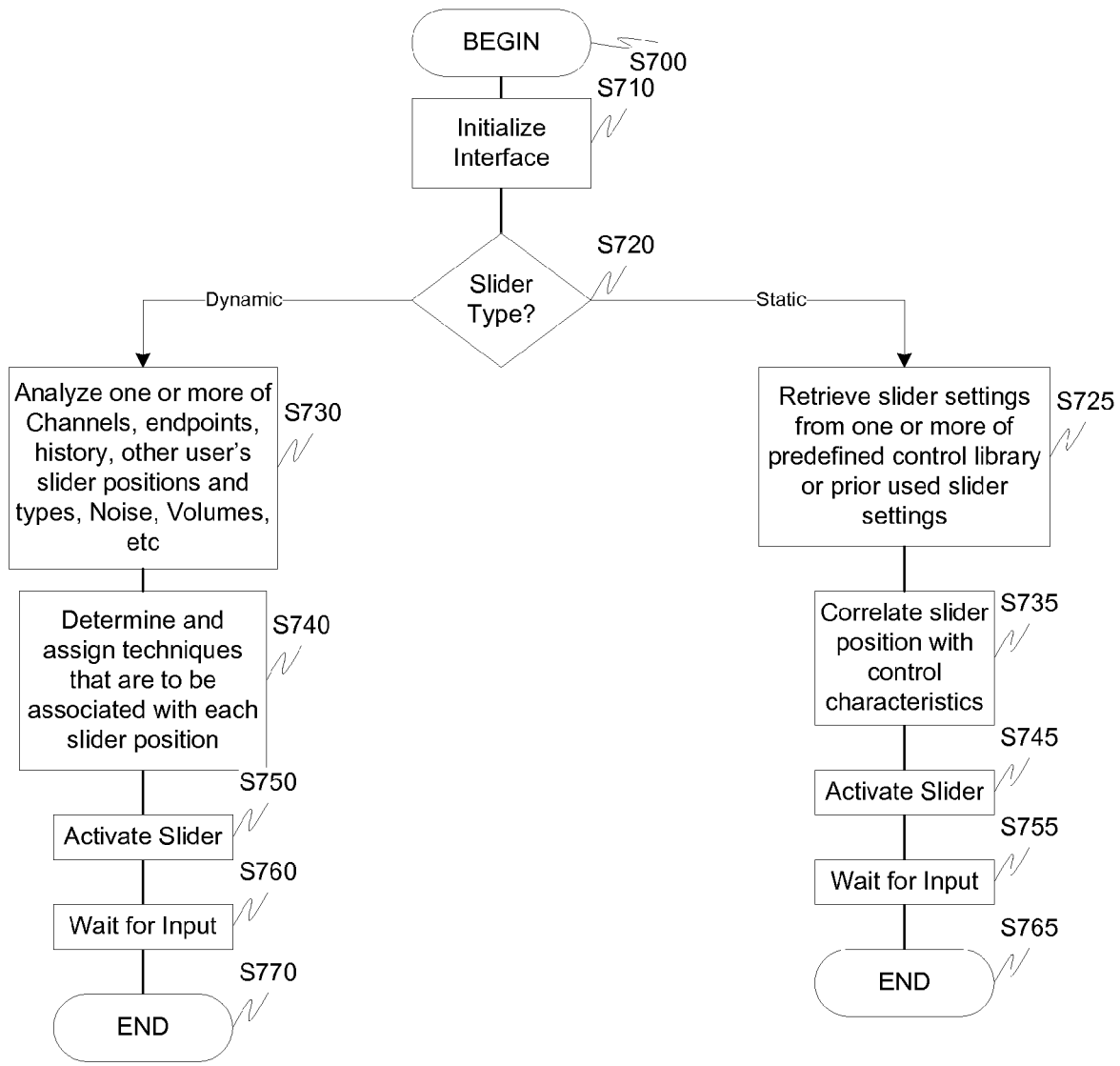
FIG. 7 is a flowchart illustrating an exemplary method for initializing a slider according to this invention.

FIG. 7 illustrates an exemplary method for controlling a conference environment according to this invention. In particular, control begins in step S700. Next, in step S710, the slider, or control, interface is initialized. Then, in step S720, a determination is made whether the sliders functionality is to be dynamic or static.

If the slider is dynamic, control continues to step S730. If the slider is to be static, control continues to step S725.

In step S730, one or more channels, endpoints, history, other user's slider positions and types, noise, volumes, and in general, any characteristic associated with the present conference and past conferences, channels and/or endpoints are analyzed. Next, and based on the analysis, the controls to be associated with each position of the slider are determined and assigned. Then, in step S750 the slider is activated and waits for input in step S760. Control then continues to step S770 where the control sequence ends.

In step S725, slider settings are retrieved from one or more of a library, prior user slider settings or in general from any location that mapped a slider position to a filtering/conference control technique. Next, in step S735 the positions of the slider are correlated with the control characteristics. Then, in step S745 the slider is activated and waits for input in step S755. Control then continues to step S765 where the control sequence ends While the above-described flowchart has been discussed in relation to a particular sequence of events, it should be appreciated that changes to this sequence can occur without materially effecting the operation of the invention. Specifically, a device can address a third party without leaving an existing communication session as long as signaling and addressing occurs outside the audio channel. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and communication arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for putting a conference call on hold. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. A method for controlling one or more conference call characteristics comprising:
providing an interface that controls one or more conference call characteristics, the conference call characteristics including one or more of noise level, gain, noise cancellation, mixer control, volume information, and filters, wherein a linear adjustment of the interface controls the one or more conference call characteristics in a non-linear manner.

2. The method of claim 1, further comprising analyzing historical information associated with one or more endpoints.

3. The method of claim 1, further comprising dynamically monitoring one or more endpoints participating in a conference call.

4. The method of claim 1, further comprising, based on an analysis of one or more endpoints associated with a conference call, determining one or more techniques that are assigned to one or more positions of the interface.

5. The method of claim 1, further comprising, based on an analysis of one or more of noise characteristics, volume characteristics and filter settings for a conference call, determining one or more techniques that are assigned to one or more positions of the interface.

6. The method of claim 1, further comprising, based on one or more endpoints joining or leaving a conference call, determining one or more techniques that are assigned to one or more positions of the interface.

7. The method of claim 1, wherein the interface is provided to one or more of conference participants and a conference host.

8. The method of claim 1, wherein different interfaces are provided to one or more conference participants.

9. One or more means for performing the steps of claim 1.

10. A computer-readable information storage media including instructions, that when executed by a processor, cause to be performed the steps of claim 1.

11. A system that controls one or more conference call characteristics comprising:
an interface that controls one or more conference call characteristics, the conference call characteristics including one or more of noise level, gain, noise cancellation, mixer control, volume information, and filters, wherein a linear adjustment of the interface controls the one or more conference call characteristics in a non-linear manner.

12. The system of claim 11, further comprising a history module that analyses historical information associated with one or more endpoints.

13. The system of claim 11, further comprising an endpoint determination module that dynamically monitors one or more endpoints participating in a conference call.

14. The system of claim 11, further comprising, based on an analysis of one or more endpoints associated with a conference call, a mixer management module that determines one or more techniques that are assigned to one or more positions of the interface.

15. The system of claim 11, further comprising, based on an analysis of one or more of noise characteristics, volume characteristics and filter settings for a conference call, a mixer management module that determines one or more techniques that are assigned to one or more positions of the interface.

16. The system of claim 11, further comprising, based on one or more endpoints joining or leaving a conference call, a mixer management module that determines one or more techniques that are assigned to one or more positions of the interface.

17. The system of claim 11, wherein the interface is provided to one or more of conference participants and a conference host.

18. The system of claim 11, wherein different interfaces are provided to one or more conference participants.

19. The system of claim 11, wherein the interface is a graphical user interface.

20. The system of claim 11, wherein the interface is associated with a conference bridge.

* * * * *